Jan. 13, 1953 W. A. BAUM 2,625,153
BLOOD PRESSURE MEASURING APPARATUS
Filed Dec. 14, 1949
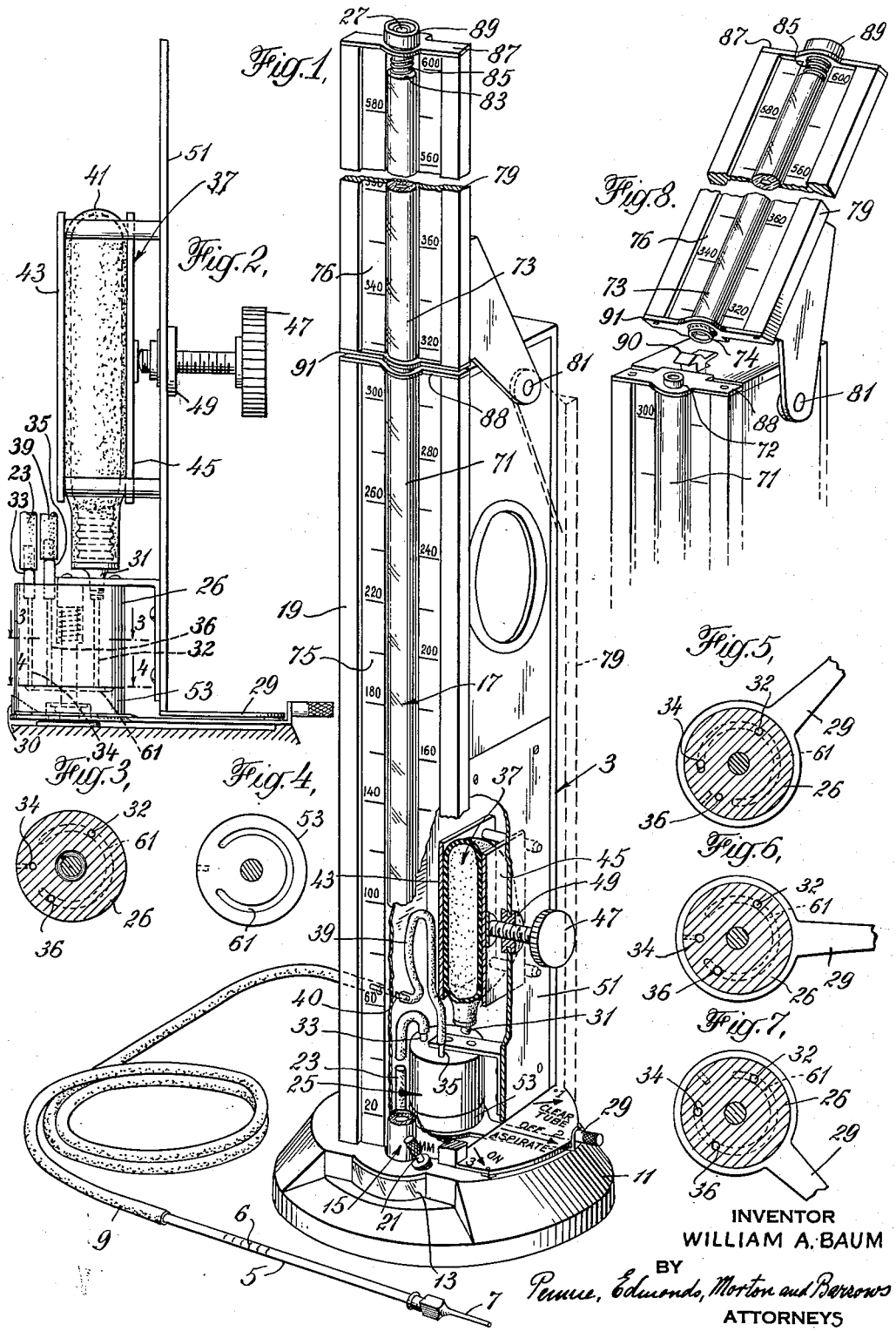
INVENTOR
WILLIAM A. BAUM
BY
Pennie, Edmonds, Morton and Barrows
ATTORNEYS

Patented Jan. 13, 1953  2,625,153

UNITED STATES PATENT OFFICE 2,625,153

BLOOD PRESSURE MEASURING APPARATUS

William A. Baum, Forest Hills, N. Y., assignor to W. A. Baum Co. Inc., New York, N. Y., a corporation of New York Application December 14, 1949, Serial No. 132,823

8 Claims. (Cl. 128—2.05)

This invention relates to apparatus for the measurement of venous pressure.

Venous pressure is most conveniently measured by establishing a hydrostatic connection with the blood mass within the vein. Devices for the measurement of venous pressure on this principle have been proposed heretofore, as in an article of G. E. Burch and Travis Winsor in the Journal of the American Medical Association, vol 123 at page 91. Instruments of this type include a hypodermic needle to be inserted into the vein of which the pressure is to be measured, a transparent observation tube connected to the needle, and a manometer pneumatically connected to the observation tube. The motion of a short column of sterile fluid in the observation tube indicates the presence of pressure differentials between the blood in the vein and the air in the manometer. An expansible bellows connected to the manometer is employed to control the motion of the fluid in the tube. When by manipulation of the bellows the fluid column is brought to rest, a constant hydrostatic pressure exists at all points between the needle and the surface of the manometer reservoir, and the venous pressure may be read from the manometer.

These instruments have been unsatisfactory in use however because of the difficulty in controlling properly the volume of air in the bellows and the initial height of the fluid column in the observation tube. To take a measurment of the pressure within the vein, a suitable quantity of a sterile solution must be drawn into the hypodermic needle and observation tube before the needle is inserted into the vein. This provides a sterile buffer between the blood in the vein and the measuring apparatus, the column of fluid at the same time serving to communicate the pressure in the vein to the manometer and to provide an indication of equilibrium. In addition it is desirable, especially in a portable instrument, to be able to clear the manometer tube of air bubbles which may work into it, by drawing the column part-way down without entirely releasing the pressure in the observation tube. Each of these operations requires selectively opening separate passages from the bellows to the observation tube and to the manometer reservoir. During the actual measurement, on the other hand, the bellows must be connected both to the reservoir and to the tube. My invention provides an improved apparatus for the measurement of venous pressure in which these separate operations may be conveniently and rapidly carried out. It also provides an instrument employing a wet or tube type manometer, with its accompanying accuracy, but of compact and portable construction. To this end the manometer tube is jointed and supported in a frame which may be folded upon itself but which provides a watertight connection between the two sections when in extended condition.

My invention will be described with reference to the accompanying drawings in which Fig. 1 is a partially cut-away perspective view of an instrument according to my invention as used in the measurement of venous blood pressure, the manometer tube being in extended position for the measurment of maximum pressures;

Fig. 2 is a side elevation of the bellows, valve and control therefor in the instrument of Fig. 1;

Fig. 3 is a section on the line 3—3 of Fig. 2;

Fig. 4 is a section on the line 4—4 of Fig. 2;

Fig. 5 is a view similar to Fig. 3 but with the valve in its first position, certain elements of the valve below the section line being shown in dotted lines;

Fig. 6 is a view similar to Fig. 5 but showing the valve in its second position;

Fig. 7 is a view similar to Fig. 5 but showing the valve in its third position, and Fig. 8 is a partial perspective view of the instrument of Fig. 1 in partially folded condition.

In Fig. 1 an embodiment of my invention is shown as it appears during the taking of a venous pressure measurment. The instrument, apart from the observation tube and hypodermic needle, is contained in a stand generally indicated at 3. For portability, provision may be made in the top of the stand for stowage of the observation tube 5, needle 7 and of a flexible tube 9 for connection of the observation tube with the manometer. A base 11 contains the reservoir 13 of an open tube manometer 15 whose tube 17 extends up the front face 19 of the instrument. The reservoir is closed except for a filler plug 21 and an air connection 23 to the valve 25, the tube 17 extending down well below the normal liquid level in the reservoir and being open to the atmosphere at its upper end 27.

The venous pressure is communicated through the needle, observation tube and connecting tube to the surface of the manometer reservoir via a three-position valve 25, controlled by a lever 29 projecting from the base of the instrument. The valve has three ports, 31, 33, 35 connecting respectively to an extensible bellows 37, to the reservoir 13 (through a tube 23) and to the observation tube and needle (through tubes 9 and 39). The bellows may consist of a rubber bag 41 (Fig. 2) held between a support plate 43 and a shoe 45 actuated by a thumb screw 47. It serves alternately to aspirate and to pressurize the needle 7 and the manometer 15. The thumb screw passes through a nut 49 affixed to a removable plate 51 forming part of the side wall of the instrument.

The construction of the valve 25 is further illustrated in Figs. 2–7. The cylindrical valve body 26 includes a bore 32 (Figs. 2 and 3) which communicates with the port 31, and two additional bores 34 and 36 communicating respectively with the ports 33 and 35 respectively. These bores, parallel to the axis of the valve body, are centered on a circle concentric with the valve body. Below the valve body 26 is affixed a circular plate 53 rotated by means of the lever 29 journaled in the base and provided with a key 30 which engages the plate 53 when the valve is assembled into the stand. As seen in Fig. 4, the plate 53 has formed in its upper surface a circumferential passage 61. This passage is concentric with the plate 53 and has the same radius as the circle on which are formed the bores 32, 34, and 36, so as to communicate with them. The passage 61 however extends only through some 270°, so that by rotation of the plate one or the other of the bores 34 and 36 may be shut off from the passage 61 (Figs. 5, 6). Conversely, the circumferential extent of the passage 61 is great enough so that all three of the bores 32, 34 and 36 may be exposed to the passage at once, as shown in Fig. 7. With the valve in the position shown in Fig. 5, passage 61 connects bores 32 and 34, establishing a connection between the bellows 37 and the manometer reservoir (from bellows 37 via port 31, bore 32, passage 61, bore 34, port 33, and tube 23). With the valve in the position shown in Fig. 6, passage 61 connects bores 32 and 36, establishing a connection between bellows 37 and observation tube 5 (from bellows 37 via port 31, bore 32, passage 61, bore 36, port 35, and tubes 39 and 9). With the valve in the position shown in Fig. 7, passage 61 connects together the three bores 32, 34, and 36, thus interconnecting the bellows, manometer and observation tube.

The manometer tube 17 is made in upper and lower sections 71 and 73. The lower section 71 communicates through a watertight joint with the reservoir 13. It is held in position in front of a calibrated scale 75 on the front face 19 of the instrument, and is stressed toward the reservoir by means of a crosspiece 88 fitting over a shoulder at its upper end, as shown in Fig. 8. The upper end of the section 71 has a shoulder 72 formed thereon upon which fits a complementary protrusion 74 formed on the lower end of the upper section 73. The section 73 is mounted on a hinged frame 79 in front of a scale 76 (affixed to the frame) which is continuous in its graduations with those of the scale 75 when the frame 79 is in upright position as shown in Fig. 1. Crosspieces 87 and 91 similar to the crosspiece 88 are affixed to the ends of the frame 79 and form bearings in which the section 73 is limited to motion parallel to its own length. The frame 79 may then be lifted into upright position as shown in Fig. 1 or folded back as shown in dotted lines. A shoulder 83 at the upper end of the tube 73 carries a spring 85 which bears against the crosspiece 87, urging the section 73 in the general direction of the hinges so that in the position shown in Fig. 1 the two sections are stressed together to form a watertight connection at their point of junction. A collar 89 above the crosspiece limits the motion of the section 73 under the influence of the spring 85 when the frame 79 is in folded position. Detents, as at 90, are provided in the stand to hold the frame 79 in either upright or folded position. The lower section 71 of the tube can be readily made of three hundred millimeters in length or more, and suffices for many measurements. Where unusually high pressures are encountered, the upper section may be brought into use as illustrated in Fig. 1.

Preliminary to taking a blood pressure measurement with the apparatus of my invention, the connecting tube 9 is affixed to a nipple 40 in the wall of the stand 3. The nipple connects through a short length of flexible tube 39 to the port 35 in the valve. A sterile observation tube having a needle affixed is then connected to the free end of the tube 9.

To prepare the instrument for the taking of a blood pressure measurement, the control lever 29 is turned to bring the valve to the position shown in Figure 6, in which the bellows is connected to the observation tube and needle only. With the valve in this position the thumb screw 47 is drawn all the way out and then returned a few turns so as to leave the bellows distended by almost but not quite the maximum amount.

Should there be bubbles in the water column of the manometer tube, they may be removed by setting the valve in the position of Fig. 5, connecting the bellows to the reservoir. By retracting the thumb screw, the bellows is distended farther and the water column is drawn down into the reservoir where the bubbles come to the surface.

The valve should then be returned to the position of Fig. 6 and the thumb screw restored to its former position with the bellows almost but not quite completely distended. The end of the needle is dipped into an ampule of a sterile solution such as 2½ per cent sodium citrate, and a small quantity of the solution is drawn into the observation tube by retracting the thumb screw 47. Sufficient solution is drawn into the tube to bring the meniscus of the solution up into the central portion thereof, which may be engraved with reference marks 6.

The valve 25 is now shifted to the position shown in Fig. 7, in which the bellows is connected both to the observation tube and to the manometer, thus forming a connection between these two. The needle is inserted into the vein whose pressure is to be measured, the vein being preferably at heart level. The pressure within the vein is balanced by manipulation of the thumb screw 47 to prevent the meniscus on the column of sterile solution from reaching the tubing 9 at the top of the observation tube. Care should likewise be taken not to compress the bellows so far as to cause the entire column of solution to be discharged into the vein.

By further control of the thumb screw the meniscus on the fluid column may be held in stationary position for a brief period of time until it has been brought permanently to rest. The venous pressure may then be read from the height of the water column in the manometer tube. To compensate for the capillary of the observation tube, it should be so held that the meniscus therein stands above the point of entry of the needle into the vein by a distance equal to the capillarity of the observation tube. By proper control the blood in the vein is prevented from entering either the needle or the observation tube, and the amount of sterile solution injected into the vein is held to a minimum.

After the pressure reading has been taken, the valve is returned to the position of Fig. 5, thus shutting-off the connection between the bellows and the water reservoir, and the needle is withdrawn from the vein.

I claim:

1. In an instrument for the measurement of venous blood pressure including a hypodermic needle connected to a pneumatic tube, a manometer and an extensible bellows for alternately aspirating and pressurizing the needle and manometer, a three-position valve adapted selectively to pneumatically connect the bellows with the needle, with the manometer, and with both, said valve comprising a valve body having three parallel bores disposed on a circle, a plate removably affixed to the valve body for rotation in a plane perpendicular to said bores about the center of said circle, and a circular channel formed in the surface of the plate adjacent the valve body concentric with said circle and having the radius thereof, said channel extending through an arc of less than 360° and greater than the least arc encompassing said three bores.

2. In an instrument for the measurement of venous blood pressure including a hypodermic needle connected to a pneumatic tube, a manometer and an extensible bellows for alternately aspirating and pressurizing the needle and manometer, a three-position valve adapted selectively to pneumatically connect the bellows with the needle, with the manometer, and with both, said valve comprising a valve body having three parallel bores opening onto a surface of said valve body, a plate removably affixed to the valve body for motion over said surface, and a channel formed in the surface of the plate adjacent the valve body, said channel being adapted to connect said one of said bores alternately with the other two of said bores and with both, according to the relative position of the plate and valve body.

3. In a blood pressure measuring instrument including a manometer for the measurement of venous blood pressure, a manometer tube having upper and lower sections, a hinged frame supporting the upper section and a calibrated scale associated with the upper section, and spring means in said frame for stressing together said upper and lower sections when in parallel position.

4. In an instrument for the measurement of venous pressure, a stand, a manometer supported in the stand, a jointed tube for the manometer having a lower section and an upper section for occasional connection to the lower section, said upper and lower sections having complementarily fitting ends, a frame hinged to the stand for support of the upper section, and spring mounting means associated with the upper section urging the same into a watertight connection with the lower section when the frame is in raised position.

5. In an instrument for the measurements of venous pressure, a stand, a reservoir type manometer supported in the stand, a jointed tube for the manometer having a lower section affixed to the manometer reservoir and an upper section for occasional connection to the lower section, said upper and lower sections having complementarily fitting ends, a frame hinged to the stand for support of the upper section, and spring mounting means associated with the upper section urging the same into a watertight connection with the lower section when the frame is in raised position.

6. In an instrument for the measurement of venous pressure including a manometer and a jointed manometer tube having a lower section supported in a stand and an upper section adapted to be connected to the lower section for the measurement of pressures higher than those measurable with the lower section alone, said lower and upper sections having complementarily fitting ends adapted to provide a watertight joint therebetween when the sections are stressed together in aligned relation, a mounting for said upper section comprising a frame hinged to the stand, bearings in said frame adapted to support the upper section, a collar formed on the upper section adjacent one of said bearings, a spring stressed between said collar and said one bearing, said spring urging said upper section in the direction of said hinges, and means to limit the travel of said upper section under the influence of said spring.

7. In an instrument for the measurement of venous pressure including a manometer and a jointed manometer tube having a lower section supported in a stand and an upper section adapted to be connected to the lower section for the measurement of pressures higher than those measurable with the lower section alone, said lower and upper sections having complementarily fitting ends adapted to provide a watertight joint therebetween when the sections are stressed together in aligned relation, a mounting for said upper section comprising a frame hinged to the stand, bearings in the frame adapted to limit said upper section in its motion relative to the frame to motion parallel to the length of the said upper section, a collar formed adjacent the end of said upper section remote from the hinges, a spring stressed between said collar and one of said bearings, and means to limit the travel of said upper section relative to said frame under the influence of said spring.

8. In venous pressure measuring apparatus including a hypodermic needle, a manometer, a pneumatic connection between the needle and monometer and a three-position valve for controllably blocking said connection, an extensible bellows adapted alternately to aspirate and to expirate the needle and the manometer via the valve, said bellows comprising a distensible bag connecting with the valve, a support for the bag, a shoe adapted to constrict the bag against the support, and means to advance the shoe relative to the support.

WILLIAM A. BAUM.

REFERENCES CITED

The following references are of record in the file of this patent:

FOREIGN PATENTS

| Number | Country | Date |
| --- | --- | --- |
| 580,822 | France | Nov. 17, 1924 |
| 650,507 | France | Jan. 10, 1929 |
| 799,505 | France | June 15, 1936 |
| 827,365 | France | Apr. 25, 1938 |

OTHER REFERENCES

Article by Burch and Winsor, in the Journal of the American Medical Association, vol. 123, pages 91–92. (Copy in Scientific Library.)